United States Patent Office 3,201,370
Patented Aug. 17, 1965

3,201,370
REACTION PRODUCTS OF ACETYLENIC DIESTERS AND POLYOLS
John M. Butler and Lee A. Miller, Dayton, and George L. Wesp, Englewood, Ohio, assignors to Monsanto Company, a corporation of Delaware
No Drawing. Filed Sept. 9, 1960, Ser. No. 54,814
10 Claims. (Cl. 260—47)

This invention relates to synthetic resins and more particularly provides polyester resins containing a plurality of olefinic double bonds and ether or thioether linkages, which resins are useful in the plastics, coatings and laminate industries. The invention also provides a method of preparing the new polyesters. A further provision of the invention is the method of preparing new and valuable cross-linked polymers by reacting the polyester resins with compounds having hydroxy and/or thiol groups. The invention also provides new and valuable cross-linked copolymers of the olefinic polyesters and vinyl compounds copolymerizable therewith.

In the copending application Serial No. 38,113, filed June 23, 1960, of Lee A. Miller and John M. Butler, there are disclosed and claimed the diesters of certain diols and certain acetylenic acids, i.e., compounds of the formula

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals and bivalent halohydrocarbon radicals of from 2 to 18 carbon atoms and is linked through diverse carbon atoms thereof to the remainder of the molecule of which it forms a part. Now we have found that said diesters are eminently suited to the manufacture of high molecular weight, polymeric materials by an addition reaction thereof with a compound of the formula HX—Y—XH where X is selected from the class consisting of oxygen and sulfur and Y is selected from the class consisting of hydrocarbyl and halohydrocarbyl radicals of from 2 to 18 carbon atoms and alkyleneoxyalkylene and polyalkyleneoxyalkylene radicals having from 2 to 4 carbon atoms in each akylene group, of from 1 to 100 oxygen atoms and a total of from 2 to 101 alkylene radicals. Compounds of this formula are either diols, dithiols or hydroxy thiols wherein the hydroxy and/or thiol radicals are linked to the same or different carbon atom of a bivalent hydrocarbon radical, a halogen-substituted hydrocarbon radical, an alkyleneoxyalkylene radical, or a polyalkyleneoxyalkylene radical. Hereinafter, for the sake of convenience, they will be referred to simply as diols.

Reaction of the diols to give the presently provided polyesters proceeds by addition of a hydroxy or thiol group across an acetylenic bond of the diester, thus:

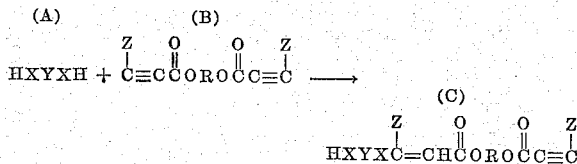

(C) may react with another mole of (C) or with (A) or (B) to extend the chain. The growing chain may react with (A) or (B) or with other growing chains of suitable reactivity. There are thus formed macromolecules having the repeating unit:

Owing to the addition mechanism, the polymers are readily obtained in a high state of purity. As will be noted, the repeating unit is the addition product of one mole of the diester $ZC{\equiv}CC(O)ORO(O)CC{\equiv}CZ$ and one mole of the diol HX—Y—XH. Hence when the two reactants are employed in equimolar proportions and the reaction is carried to completion, there is obtained as product a high molecular weight polymer which is free of by-product.

Acetylenic diesters which are suitable for use in the present process are esters of dihydroxy compounds of the formula HO—R—OH where R is selected from the class consisting of bivalent hydrocarbon radicals and bivalent halohydrocarbon radicals of from 2 to 18 carbon atoms and is linked through diverse carbon atoms thereof to the two hydroxy groups, and of acetylenic dicarboxylic acids of the formula $ZC{\equiv}CCOOH$ where Z is selected from the class consisting of hydrogen, alkyl radicals of from 1 to 5 carbon atoms and aryl radicals of 6 to 10 carbon atoms. As disclosed in the copending application of Miller and Butler referred to above, the diesters are prepared by esterification of the dihydroxy compound with either the free acetylenic acid or the acyl halide or anhydride thereof. Use of temperatures below 120° C. and operation in the presence of a diluent are recommended.

The dihydroxy compounds which are used for the preparation of the diesters that are employed in the present invention may be aliphatic, cycloaliphatic, aromatic, or aliphatic-aromatic, and they may be saturated or unsaturated. Thus, as examples of dihydroxy compounds which give acetylenic diesters of present utility are the aliphatic diols, e.g., ethylene glycol, 1,2- or 1,3-propanediol, 1,2-, 1,3-, 1,4- or 2,3-butanediol, 1,3-, 1,4-, 1,5-, 2,3- or 2,4-pentanediol, 2-butene-1,2-diol, 2-butene-1,4-diol, 2-bromo-1,3-propanediol, 2-fluoro-1,3-propanediol, 2-butyne-1,4-diol, 2-methyl-1,5-pentanediol, 1,4-dichloro-2,3-butanediol, 2,3-dibromo-1,4-butanediol, 2- or 4-chloro-1,3-butanediol, 2,4-dimethyl-2,4-pentanediol, 1,1,1-trifluoro-2,3-butanediol, 2,2-diethyl-1,4-butanediol, 2-pentyn-1,4-diol, 2-pentene-1,5-diol, 2-propyl-1,3-butanediol, 2-chloro-1,5-pentanediol, 5-iodo-1,4-hexanediol, 1,4-hexanediol, 5-methyl-1,2-hexanediol, 2-ethyl-1,3-hexanediol, 2-tert-butyl-3,3,4,4-tetramethyl-1,2-pentanediol, 4-methyl-1,4-hexanediol, 1,6-hexanediol, 3,3-dimethyl-1,6-hexanediol, 2,4-dimethyl-3-hexene-2,5-diol, 2,3-, 2,4-, 2,5-, or 3,4-hexanediol, 1-chloro-2,5-dimethyl-3-hexyne-2,5-diol, 1,2,3,6-hexanetetrol, 2,4-hexadiyne-1,6-diol, 1,6-, 1,7-, 2,4-, 2,5-, or 4,4-heptenediol, 2-heptene-1,6-diol, 1-chloro-2,5-dimethyl-3-heptyne-2,5-diol, 5-ethyl-3-methyl-2,4-heptanediol, 1,2-, 1,3-, 1,4-, 1,8-, 2,4-, 2,7-, or 4,5-octanediol, 2-methyl-2-octene-1,4-diol, 2,4,4,5,5,7-hexamethyl-3,6-octanediol, 2,7-dimethyl-4-octane-2,7-diol, 2-butyl-4-ethyl-3-methyl-1,3-octanediol, (3-heptafluoropropyl)-1,5-pentanediol, 1,9-nonanediol, 1,2- or 1,10-decanediol, 1,2- or 1,12-dodecanediol, 5-decyne-4,7-diol, 5,9-dimethyl-8-decene-1,5-diol, 5,8-diethyl-6,7-dodecanediol, 9-octadecene-1,12-diol, 9,10- or 1,12-octadecanediol, 1,9- or 1,11-undecanediol; 1,13-tridecanediol; 1,2-tetradecanediol, 1,2- or 1,16-hexadecanediol, 16-methyl-1,2-heptadecanediol, 1,2- or 1,12-octadecanediol, 2-methyl-1,2-propanediol, 2-butyl-2-ethyl-1,3-propanediol, 2,2-diethyl-1,3-propanediol, propanediol, 2-isobutyl-1,3-propanediol, 2-ethyl-1,3-butanediol, 2,2-diethyl-1,4-butanediol, 2,2,3,3,-tetramethyl-1,4-butanediol, etc.

Examples of the benzenoid diols which are useful for esterification with the acetylenic acid, halide or anhydride to give presently useful diesters are o, m or p-xylene-α,α'-diols, 3,6-dimethyl-o-xylene-α,α'-diol, α,α'-dimethyl-p-xylene-α,α'-diol, 1,6-diphenyl-1,6-hexanediol, 1,2-diphenyl-1,2-ethanediol, 1- or 2-phenyl-1,2-propanediol, 2-methyl-1-phenyl-1,2-propanediol, 2-di-o-tolymethyl-1,3-propanediol, 2-methyl-3-phenyl-1,2- butanediol, 1,4- or 2,2-diphenyl-1,4-butanediol, 2,3-dimethyl - 1,4 - diphenyl - 1,4 - butanediol, 1,6- or 1,8-naphthalenedimethanol, α-, α³-mesitylenediol, o-benzenediethanol, α,α' - dimethylhydrobenzoin, 2,3 - dibenzylidene - 1,4 - butanediol, 1,1 - bis - (p-bromophenyl)-2-butyne - 1,4 - diol, 1 - phenyl - 1,5 - pentanediol, hydroquinone, resorcinol, 2,6-dichlororesorcinol, pyrocatechol, 4 - tert - butyl - 5 - chloropyrocatechol, 4-dodecylpyrocatechol, p,p'-biphenol, 4,4'-dichloro-o,o'-biphenol, 2,2', 6,6' - tetraisopropyl - p,p', - biphenol, 1,8 or 1,2-naphthalenediol; 2 - bromo - 3 - methyl-1,4-naphthalendiol, 4,4''-p-terphenyldiol, etc.

Alicyclic diols useful for the preparation of the presently employed acetylenic diesters are, for example, cyclohexyl - 1,2 - ethanediol, 1 - cyclohexyl-1,2-ethanediol, 1 - cyclohexyl - 2 - methyl - 1 - phenyl-1,3-propanediol, 5 - cyclohexyl - 2 - methyl - 2,3-pentanediol, 1,2-, 1,3- or 1,4 - cyclohexanediol, 4 - cyclopentyl - 1,2-cyclohexanediol, 1,2 - dimethyl - 1,2 - cyclohexanediol, 1,1-cyclopropanedimethanol, 1,2,2,3,5,5 - hexamethyl - 1,3 - cyclohexanediol, 2 - cyclohexyl - 1,4 - cyclohexanediol, p,p'-bicyclohexanol, 1,1 or 1,2-cyclopentanedimethanol, 3,4-dichloro - 1,2 - cyclopentanediol, 3 - cyclopentane-1,2-diol, 1,2 - dimethyl - 1,2 - cyclopentanediol, decahydro-2,7 - naphthalenediol, decahydro - 2,3 - naphthenedimethanol, (bicyclohexyl) - 1,1' - dimethanol, 4 - cyclohexylresorcinol, 3,6 - dibromo - 4 - cyclohexene - 1,2-diol, 4,5 - dimethyl - 4 - cyclohexene - 1,2 - dimethanol, etc.

The acetylenic acids which are reacted with the polyols to give the presently useful acetylenic diesters may be 1-alkynoic acids of from 3 to 8 carbon atoms or arylpropiolic acids of from 9 to 13 carbon atoms. Acyl halides or anhydrides of such acetylenic acids may be used instead of the acids. The following are some examples of acetylenic acid compounds which are reacted with the above described diols to give esters of use in the present invention: propiolic acid, propiolyl chloride, bromide, iodide or fluoride, propiolic anhydride, tetrolic acid, 2-pentynoic acid, 2-hexynoic acid, 2-heptynoic acid, 2 - octynoic acid, 2 - octynoyl chloride, trimethyltetrolic acid, phenylpropiolic acid, phenylpropiolyl chloride, 2,3,4,6 - tetramethylphenylpropiolic acid, o-, m- or p-tolylpropiolic acid, 1-naphthalenepropiolic acid, etc.

The propiolyl halide which may be used as one of the reactants of the esterification reaction my be prepared by reacting propiolic acid with benzoyl halide, as disclosed in the copending application of Lee A. Miller, Serial No. 6,344, filed February 3, 1960. The propiolyl chloride so formed may be led directly, without intermediate recovery, into a solution or suspension of the diol which is to be esterified for preparation of the presently employed acetylenic diesters.

Some examples of the acetylenic diesters which are useful for the preparation of the presently provided high molecular weight polymers are given below:

3-butene-1,4-diol dipropiolate
Ethylene glycol dipropiolate
2,3-dimethyl-1,3-pentanediol di-2-pentynoate
Propylene glycol dipropiolate
2-methyl-1,5-pentanediol bis(phenylpropiolate)
2-heptene-1,6-diol dipropiolate
1,6-methyl-1,2-heptadecanediol 2-pentynoate
Hydroquinone dipropiolate
o-Benzenediethanol bis(phenylpropiolate)
1-phenyl-1,2-propanediol dipropiolate
4,4-dichloro-o,o'-biphenol dipropiolate
Dicyclo-p,p'-hexanol dipropiolate
1,2-cyclopentanediol bis(phenylpropiolate)
4-cyclohexene-1,2-dimethanol di-2-pentynoate
1,1-cyclopropanedimethanol dipropiolate
Cyclohexane-1,2-ethanediol bis(phenylpropiolate)
3-cyclopentene-1,2-diol bis(1-naphthalenepropiolate)
Decahydro-2,3-naphthalenedimethanol dipropiolate
2-methyl-1,2-propanediol dipropiolate
2-methyl-2-octene-1,4-diol dipropiolate
1,6-hexanediol bis(4-tolylpropiolate)

The diols which are used with the above described acetylenic diesters to give the presently provided polymers have the formula HX—Y—XH where X is selected from the class consisting of S and O, and Y is selected from the class consisting of hydrocarbyl and halohydrocarbyl radicals of from 1 to 18 carbon atoms and alklyleneoxyalkylene and polyalkyleneoxyalkylene radicals having from 2 to 4 carbon atoms in the chain of each alkylene group and a total of 2 to 6 carbon atoms in each alkylene group, a total of from 1 to 100 oxygen atoms and a total of from 2 to 101 alkylene radicals.

The diols used to add to the dipropiolates for the purpose of preparing the present addition polymers can be the same as those used in the prepartion of the acetylenic diesters, i.e., they may have the formula HO—R—OH where R is selected from the class consisting of hydrocarbyl and halohydrocarbyl radicals of from 2 to 18 carbon atoms and is linked through diverse carbon atoms thereof to the two hydroxy groups. Such diols have been disclosed above. Other presently useful diols may also be hydrocarbyl or halohydrocarbyl diols in which the two hydroxy radicals are linked to the same carbon atom. Thus there may be used 1,1-cyclohexanediol, 2,2-difluoro - 1,1 - ethanediol, 2,2,2 - trichloro - 1,1,-ethanediol (chloral hydrate), diphenylmethanediol, hexachloro - 2,2 - propanediol, etc. When employing diols in which the two hydroxy radicals are attached to the same carbon atom there may occur not only the linear polyetherification shown above, ie., the production of high molecular weight polymers in which the repeating unit is

but also some cross-linking of the polymer chains. Apparently, each of the two closely adjacent hydroxy groups of such diol reacts at the highly active β-vinyl ether grouping of the linear polyester unit. This may be avoided by regulating the reaction, i.e., by choice of catalyst and the amount thereof, extent of heating, use of a diluent, etc.

As herein stated, the presently useful diols can also be alkyleneoxyalkylene or polyalkyleneoxyalkylene diols, i.e., compounds of the formula HO-alkylene-O(alkylene-O)$_n$-alkylene-OH where the alkylene group has from 2 to 4 carbon atoms in a chain and a total of from 2 to 6 carbon atoms and $n$ is a number of 0 to 99. Examples of diols of this formula and useful for the present purpose are the di and polyglycols such as diethylene glycol, dipropylene glycol, diisopropylene glycol, dibutylene glycol, diisobutylene glycol, di-2,3-butaneglycol, triethylene glycol, tetraethyleneglycol, pentapropylene glycol, octaethyleneglycol, dodecaethylene glycol, pentadecapropylene glycol, and other polyalkylene glycols, many of which are commercially available, which have molecular weights of up to, say, 2500. The presently useful polyalkylene glycols may consist of as many as 101 alkylene units joined through oxygen atoms in a chain and having one hydroxy radical at each of the terminal alkylene radicals of the chain. Such polyglycols are readily available, as known to those skilled in the art, by the addition reaction of an alkylene glycol with an alkylene oxide.

Instead of using diols as a reactant for preparation of the linear polyester there may be used dithiols, i.e., compounds having the formula HSYSH where Y is either the hydrocarbyl, the halohydrocarbyl, or alkyleneoxyalkylene or polyalkyleneoxyalkylene radical described above. Examples of the presently useful dithiols are 1,2-ethanedithiol, 1,4-butanedithiol, 1,3-propanedithiol, 1,2-propanedithiol, 2,3-butanedithiol, 1,5-pentanedithiol, 1,6-hexanedithiol, 3,4-hexanedithiol, 1,10-decanedithiol, 1,12-dodecanedithiol, 1,18-octadecanedithiol, 1,4-benzenedithiol, 1,3-benzenedithiol, 1,4-cyclohexanedithiol, 1,8-naphthalenedithiol, 4,4'-biphenyldithiol, 2-butene-1,4-dithiol, 3-hexyne-1,6-dithiol, 2,3-dichloro-1,4-butanedithiol, 2-fluoropropanedithiol, 2-chloro-1,4-benzenedithiol, 2(2-thioethoxy)ethanethiol, dithio decaethylene glycol, phenyl-1,2-ethanedithiol.

Instead of using a diol or a dithiol, there may be used a compound having one thiol group and one hydroxy group, i.e., a compound of the formula HS—Y—OH wherein Y is as above defined. Presently useful compounds of this formula are, e.g., 2-mercaptoethanol, 2-mercapto-1,2-diphenylethanol, 4-mercaptophenol, 4-mercaptocyclohexanol, 7-mercapto-2-octen-1-ol, 5-mercapto-1-hexyn-3-ol, 2(2-thioethoxy)ethanol, monothio pentaethylene glycol, etc.

Reaction of the acetylenic diester with the diol (or dithiol or thio hydroxy compound) is generally conducted in the presence of a catalyst which may be acidic or basic, and in the presence of an inert liquid diluent or solvent. Preferably, the catalyst is an organic base. Such a catalyst is particularly desirable when the reaction is effected in the presence of a liquid diluent or solvent. Examples of presently useful basic catalysts are, e.g., the heterocyclic nitrogen bases such as N-methylmorpholine, pyridine, quinoline, N-ethylpiperidine, picoline, quinaldine, 4-methylpyrimidine, or N-phenylpyrazole; the tertiary amines such as triethylamine, triamylamine, tri-tert-butylamine, N,N-dimethyaniline, N-benzyl-N-methylaniline and triethylenediamine; quaternary ammonium compounds such as benzyltrimethylammonium methoxide or tetrabutylammonium butoxide; alkali metal alkoxides such as sodium or potassium methoxide or propoxide, etc. Liquid diluents which are inert under the reaction conditions are generally useful. Such diluents or solvents may be, e.g., acetone, benzene, xylene, hexane, dioxane, tert-butanol, tetrahydrofuran, etc. The use of a diluent or solvent in the reaction will depend upon the nature of the reactants as well as upon the reaction conditions which are employed. When using a solid acetylenic diester which is insoluble in the diol component it is generally recommended that a diluent be employed; on the other hand, when both the ester and the diol are liquids at the reaction temperature a diluent need not be used unless the ester and/or the diol are extremely reactive. In that case, the use of an inert diluent will serve to moderate the reaction. The reactivity of the diol component depends to a great extent on the aliphatic versus aromatic character of the diol as well as upon the configuration of the diol structure. Generally, aliphatic diols are more reactive than phenols. The quantity of the catalyst to be used also depends upon the nature of the acetylenic ester and of the diol; obviously the more reactive reactants will require less catalyst than will the more sluggish reactants. Whether or not a diluent is used will likewise regulate catalyst quantity. Also variable is the temperature at which reaction is effected; for here again must be taken into consideration the nature of the reactants, whether or not a diluent is used, and the nature and quantity of the catalyst. Although some of the present addition polymerizations can be conducted at ordinary room temperature or even at decreased temperatures, say, −10° C. to 10° C., in other instances heating of the reaction mixture will be needed. All of these variables, i.e., catalyst quantity, use of diluent and temperature conditions can readily be arrived at by easy experimentation. Since reaction is evidenced by evolution of heat and a change in viscosity, whether or not one or both of such phenomena occur will be indicative of reaction. Very rapid reaction at room temperature, as evidenced by rapid temperature rise will show the need for a diluent, and/or lower temperature and/or less catalyst. Conversely, no reaction or only a very slow reaction at room temperature will indicate the use of more extreme conditions, i.e., extraneous heating and/or no diluent and/or more catalyst. Thus arrival at optimum reaction conditions is simply a matter of routine procedure by one skilled in the art. To assure complete reaction in experimental runs it is generally recommended that the reaction mixture be allowed to stand for some time after the primary, generally exothermic reaction has subsided. Completion of the reaction can then be ascertained by simply noting cessation in change of viscosity.

When the addition polymerization has been effected in the absence of a solvent or diluent, generally no further treatment of the product is required previous to its use, say, as a plasticizer, a casting or molding resin, or impregnant. When the reaction is effected in the presence of a diluent which is a non-solvent for the polymer, the precipitated resinous product is simply filtered off, washed and dried. When the reaction is conducted in a liquid which is a solvent for the polyester, the latter is separated from the reaction mixture by mixing with a liquid which is a non-solvent for the polyester. The precipitate or coagulate thus formed consists essentially of the polyester. The coagulates are then filtered off and washed and dried to give the resinous polyesters. However, solutions of the polyester need not be coagulated to give useful products; for many purposes the solutions per se may be used directly, e.g., as bonding adhesives and as impregnating agents. The solutions may also be used for conversion of the soluble, linear polyester content thereof into insoluble, cross-linked resins.

To recapitulate: in the preparation of the present polyesters, the acetylenic diester is reacted with the diol in the presence of a basic catalyst and in the presence or absence of an inert diluent or solvent at a temperature which may be as low as, say, −10° C. and as high as, say, 125° C. and the resulting mixture is allowed to stand until a very high molecular weight polyester is achieved. The acetylenic ester and the diol are employed in substantially stoichiometric proportions in order to avoid need of separating unreacted material, and the etherification is preferably conducted in an oxygen-free atmosphere, for example, nitrogen or other inert gaseous atmosphere. Depending upon the individual reactants and catalyst and upon whether or not a diluent is used, extraneous heating may or may not be employed; but when it is used, the mixture is heated up gradually, say, at a rate of 1 to 5° C. per minute to a temperature which may be up to 125° C. but is more generally from 60° C. to 90° C. Also, depending upon the nature of the individual reactants, the quantities thereof and the reaction conditions, completion of the reaction as noted by no further change in viscosity, is obtained within a time that will range from, say, a few minutes to several days. Whether or not a linear polyester is obtained and the molecular weight of the polymer will depend to some extent on the proportion of reactants employed. The high molecular weight, linear polyesters are generally obtained when the diol and the acetylenic ester are used in substantially equimolar proportions.

Alternative procedures may involve the use of a mixture of two or more acetylenic esters, for example, a mixture of the dipropiolate of ethylene glycol and the bis-(phenylpropiolate) of 4,4'-isopropylidenediphenol. Likewise there may be used a mixture of diols to obtain polymers having various linkages dispersed more or less randomly in the polymer chain.

The presently provided linear polyesters range from clear, viscous liquids to transparent solids. As will be shown hereinafter, the viscous liquids can be reacted with poly-functional compounds to give cross-linked or cured products to give high melting, solvent-resistant resins. Of particular importance, however, are those of the presently provided linear polyesters which are solid resinous materials, per se, i.e., without subsequent curing treatment.

Such products are readily compression molded with heating to give molded objects which are tough, transparent and of good dimensional stability. The polymers may also be cast into films from solutions thereof or fibers may be prepared therefrom by extruding through a suitable orifice into a precipitating bath. Solutions of the solid polymers or the viscous polymers which are obtainable under some conditions by incomplete polymerization are useful as impregnating agents and adhesives in the manufacture of laminates. Either the solid or viscous polymers are also advantageously employed in resinous base surface coatings, i.e., paints, varnishes, lacquers and enamels. The viscous polymers or solutions of the linear polymers are also useful in the manufacture of tiles, linoleums, wallboards, etc. by mixing them with comminuted matter, such as ground cork, wood flour, asbestos, mineral fillers or the like and either completing the polymerization or evaporating the solvent or diluent. The cross-linked gels as well as the presently provided viscous polymers are likewise useful as surface coatings, as potting compounds and as sealants. An especially interesting utility of the present polymers, particularly of the gels, is in the formulation of solid or semi-solid propellant fuels for rockets and other self-guided missiles.

Those of the linear polyesters which are not solid, resinous materials can be treated with a curing or cross-linking agent to give tough, substantially infusible and insoluble products. Thus, they can be cured with sulfur or other vulcanizing agents, e.g., para-quinone dioxime or para-dinitrosobenzene to give rubbers. When heated with compounds having activated carbon atoms and/or active hydrogen atoms in the presence or absence of condensing or polymerizing catalysts, there are obtained cross-linked polyesters which are hard and tough and which are very resistant to attack by heat and solvents.

Compounds reactive under curing conditions with the presently provided linear polyesters to give tough, cross-linked resins are, for example, compounds containing a vinyl ($CH_2:CH-$) radical and copolymerizable with the linear polyesters such as styrene, vinyl acetate, vinyl chloride and methyl vinyl ketone; the alkylene, cycloalkylene or arylene isocyanates or isothiocyanates such as ethylene diisocyanate, trimethylene diisothiocyanate, cyclohexylene-1,2-diisocyanate or 1,4-diphenylene-diisocyanate; polyfunctional compounds such as polyhydroxy, polycarboxy, or polyamine acid compounds, e.g., propylene glycol, maleic acid, diethylenetriamine or tricarballylic acid; and alkenyl esters of $\alpha,\beta$-unsaturated dicarboxy acids such as allyl fumarate or maleate.

The cross-linked polymers obtained by heating the present linear polyesters with a mono-vinyl aromatic compound or mixtures of such compounds under curing conditions, e.g., in the presence of a catalyst of polymerization, are of exceptional interest in that they comprise valuable resinous materials of high utility in the preparation of moldings, castings, laminates and fibers and surface coatings. Presently useful polymerization catalysts are, e.g., peroxidic compounds such as benzoyl peroxide, tert-butyl hydroperoxide, cumene hydroperoxide, or potassium persulfate or azo compounds such as $\alpha,\alpha'$-azobisisobutyronitrile, etc. Moldings and castings formed from such cross-linked polymers are transparent, substantially colorless, tough products which are characterized by good dimensional stability and resistance to heat and moisture. Monovinyl aromatic compounds useful for the preparation of the cross-linked polyesters are compounds in which one vinyl group is attached to a carbon atom of a benzene, biphenyl, naphthalene, fluorene or acenaphthene ring structure. The ring may contain other substituents such as chlorine, fluorine, alkoxy, alkyl, hydroxy, trichloromethyl, trifluoromethyl or acetyl. The vinyl group may or may not be substituted. As illustrative of compounds included within the scope of monovinyl aromatic compounds may be mentioned styrene $\alpha$-methylstyrene, 3,4-dichlorostyrene, 4-fluorostyrene, $\alpha$-chlorostyrene, 4-vinyltoluene, 3-(trifluoromethyl)styrene, 4-vinylanisole, 4-vinylacetophenone, $\alpha$-vinylnaphthalene, 4-vinylbiphenyl, 3-vinylfluorene, 2-vinylacenaphthene, etc.

The invention is further illustrated by, but not limited to, the following examples:

*Example 1*

To a mixture consisting of 0.0148869 mole of the dipropiolate of 2,2 - dimethyl-1,3-propanediol, 0.0148869 mole of ethylene glycol and 12 ml. of pure dioxane there was added 0.75 ml. of a catalyst solution prepared by diluting 0.2243 g. of triethylenediamine to 10 ml. with pure dioxane. The immediate, strong, exothermic reaction was moderated by cooling in a water-bath. After standing for 22 hours at 50° C., the reaction mixture was clear and very viscous. It was coagulated in methanol, washed with water and dried at 115° C. to give a 95.4% yield of the light amber solid polyester having an 0.2% cyclohexanone specific viscosity of 0.182 at 25° C. Compression molding of the polymer at 110° C. gave a clear, light amber molded piece. Clash-Berg evaluation gave $T_f$ 21.5° C., $T_{2000}$ 33.5° C., and a torsional modulus of 61,000 p.s.i. at 25° C. The molded polymer was found to have a tensile strength of 560 ps.i. at yield and 2300 p.s.i. at break and an elongation of 5% at yield and 346% at break.

*Example 2*

This example shows the effect of variation of catalyst quantities and temperature control on the preparation of linear polyesters from ethylene glycol and the dipropiolate of 2,2-dimethyl-1,3-propanediol. The catalyst which was employed was a solution of triethylenediamine in dioxane, 0.2243 g. of the amine being present per 10 cc. of dioxane. Six respective experiments were set up, employing in each case one-sixth of the following mixture: 6.287 g. (0.101284 mole) of ethylene glycol, 21.0883 g. (0.101284 mole) of the dipropiolate, and 80 ml. of sodium-purified dioxane. To each of these there was added the quantity of catalyst solution shown in the table below at the temperature indicated below:

| Run Number | Catalyst Sol'n Added, Ml. | Millimoles of Catalyst/ Mole of Dipropiolate | Temp., ° C., before Catalyst Add'n |
| --- | --- | --- | --- |
| 1 | 0.22 | 3.0 | 26 |
| 2 | 0.15 | 2.0 | 26 |
| 3 | 0.036 | 0.5 | 26 |
| 4 | 0.22 | 3.0 | 0 |
| 5 | 0.73 | 10.0 | 0 |
| 6 | 0.15 | 2.0 | 0 |

Immediately upon addition of the catalyst, all of the reaction mixtures became slightly yellow. The temperature of each reaction mixture was ascertained at intervals of from a fraction of a minute to a few minutes. In Run 1, the temperature of the reaction mixture increased to 97° C. within 1.83 minutes, at which point venting was employed to relieve pressure. At the end of 25 minutes the temperature had decreased to 35° C., observation of the reaction mixture was discontinued, and the reaction vessel was capped and set aside. In Run 2, the temperature of the reaction mixture rose to a maximum of 99° C. at the end of 2.5 minutes and decreased to 37° C. at the end of 26 minutes, at which point observation was discontinued. In Run 3, the temperature of the reaction mixture rose to a peak of 80.3° C. in 8.75 minutes and decreased to 40° C. at the end of 27.5 minutes. In Run 4, starting from an initial temperature of 0° C., cooling was discontinued at the end of 4.25 minutes owing to crystallization in the reaction mixture. The temperature then rose to 10° C. 9.5 minutes after addition of the catalyst and increased to 26.5° C. 40 minutes after catalyst addition. In Run 5, in which experiment the catalyst had also been introduced at 0° C. the temperature of the reaction mixture rose to 12° C. within 0.5 minute and reached a peak of 25° C. at the end of 1.17 minutes. At the end of 3.17 minutes additional cooling was employed and 10.75 minutes after addition of catalyst the reaction mixture was removed from the ice-bath. The temperature was 23° C. 27 minutes after addition of catalyst, and at this point observation was discontinued. In Run 6, also conducted initially with ice cooling, the temperature of the reaction mixture rose to 3° C. within 3 minutes after addition of catalyst, but since some crystallization occurred, the reaction mixture was removed from the ice-bath. Only occasional cooling was then used, and at the end of 18 minutes the temperature was 15° C. and cooling was discontinued. However, since the reaction still appeared to be exothermic 21 minutes after addition of catalyst, the remainder of the reaction was effected in a 25° C. water-bath. Thirty-five minutes after addition of catalyst the temperature of the reaction mixture was 26° C. and at this point observation was discontinued. All of the runs were further processed by maintaining them in the oven at a temperature of 55° C. for 16 hours. At the end of this time Runs 1, 2, and 3 were of a very light amber color, Run 5 was straw colored, and Runs 5 and 6 were light straw colored. It is of interest that those of the runs that were lightest in color were controllable to a low temperature in the initial reaction period. Rather viscous, clear solutions were obtained in all six of the experiments. These were then respectively coagulated in water, washed and dried at 110° C. for 4 hours. Products thus obtained in Runs 1–4 and 6 were of a very light yellow color, whereas that obtained in Run 5 was light amber. The specific viscosities of 0.2% solutions of the polymers in cyclohexanone, determined at 25° C., were found to be as follows:

Run number: Sp.
1 _____ 0.157
2 _____ 0.151
3 _____ 0.153
4 _____ 0.171
5 _____ 0.182
6 _____ 0.161

*Example 3*

This example shows the effect of variation in catalyst concentration and temperature control in the preparation of polymers from diethylene glycol and the dipropiolate of 2,2-dimethyl-1,3-propanediol. The catalyst which was used was prepared by diluting 0.0561 g. of triethylenediamine to 10 ml. with pure dioxane. The following experiments were conducted by adding to a mixture of the quantity of glycol and dipropiolate and dioxane shown below the amount of this catalyst solution indicated below:

| Run No. | Diethylene, g. | Glycol, mole | Dipropiolate, g. | Dioxane, ml. | Catalyst solution, ml. |
|---|---|---|---|---|---|
| 1 | 1.6665 | 0.015704 | 3.2697 | 11.4 | 2.0 |
| 2 | 1.6730 | 0.015765 | 3.2806 | 11.7 | 1.0 |
| 3 | 1.6411 | 0.015465 | 3.2000 | 11.9 | 0.4 |
| 4 | 1.6794 | 0.015826 | 3.2951 | 12.0 | 0.2 |
| 5 | 1.7004 | 0.016023 | 3.3615 | 10.0 | 6.0 |
| 6 | 1.6919 | 0.15943 | 3.3195 | 11.4 | 2.0 |

In each case the molar quantity of dipropiolate was that of the glycol.

Runs 1–4 were initiated at room temperature, i.e., about 26° C. Runs 5 and 6 were conducted at 0° C., the reaction being effected in an ice water-acetone bath maintained at a temperature of 3° C. Constant agitation was employed during the reaction in each case. In Run 1 the temperature rose to a peak of 94° C. within 2.5 minutes. At the end of 22 minutes the temperature had decreased to 40° C. and observation was discontinued. In Run 2, the temperature of the reaction mixture rose to a peak of 80.5° C. in 4.0 minutes and decreased to 40° C. at the end of 23 minutes. In Run 3, a peak of 55° C. was not reached until 15.83 minutes after addition of the catalyst and at the end of 37 minutes the temperature had decreased to 34° C. In Run 4, a peak of 39.5° C. was attained at the end of 30 minutes and at the end of 88 minutes the temperature had decreased to 32° C. In Run 5, the temperature of the reaction mixture rose to 15° C. at the end of 3.75 minutes. Additional cooling decreased the temperature to 10° C. by the end of 8 minutes, at which point the reaction vessel was withdrawn from the bath and allowed to attain room temperature so that at the end of 29 minutes the temperature of the reaction mixture in this run was 25.5° C. In Run 6 the temperature of the reaction mixture rose to 10° C. at the end of 2.17 minutes, at which point occasional cooling to keep the temperature at about 10° C. was initiated. At the end of 17.0 minutes, at which time the temperature was still 10° C., the reaction mixture was removed from the bath and by the end of 40 minutes the temperature was 32° C. At this point observation was discontinued. All of the reaction mixtures were further polymerized by maintaining them in an oven at 50° C. for 16 hours. Observation of the reaction products at the end of that time showed that only that of Run 5 had gelled. The viscosity of the other reaction mixtures decreased in the order of 6, 2, 1, 3 and 4. Reaction mixtures 3 and 4 were clear and very light yellow, whereas the others were somewhat darker. These results showed that increase in catalyst concentration has substantially more effect on the degree of polymerization than does the temperature at which the reaction is conducted.

*Example 4*

This example shows the effect of ester:diol ratio in the preparation of polyesters from the dipropiolate of 2,2-dimethyl-1,3-propanediol and a commercially available polypropylene glycol having an average molecular weight of about 2000 and provided by the Dow Chemical Company as "Polypropylene Glycol P 2000." Three experiments were conducted in which the quantities of dipropiolate and the polypropylene glycol shown below were employed.

| Run No. | Glycol, g. | Dipropiolate g. |
|---|---|---|
| 1 | 11.1438 | 1.1021 |
| 2 | 10.9440 | 1.1393 |
| 3 | 11.0047 | 1.2029 |

The quantities used in Run No. 2 above were equimolar. In Run No. 1 there was employed 5% less than the equimolar quantity of the dipropiolate based on the glycol and in Run No. 3 there was employed a 5% excess of an equimolar quantity of the dipropiolate. In each case the respective mixtures of dipropiolate and glycol were warmed to solution and cooled before addition of two drops of N-methylmorpholine to each mixture. The respective mixtures were then placed in an 80° C. oven and observed a intervals. After 5 minutes each mixture was very light amber and hazy. At the end of 45 minutes each mixture was slightly darker, but still hazy. At the end of a total of 67 hours the respective mixtures appeared to be the same, i.e., each was dark amber and hazy. In each case the viscosity had increased considerably. Whereas the Gardner viscosity of the polyglycol reactant was K, that of the reaction product obtained in Run 1 was found to be from $Z_4$ to $Z_5$; that from Run 2 was $Z_5$–$Z_6$, and that from Run 3 was $Z_6$. Accordingly, in the reaction the use of greater than an equimolar amount of the diester with respect to the diol leads to the production of polyester product which is more viscous than that obtained with equimolar mixtures of the reactants, and, conversely, use of less than equimolar mixtures leads to reduction in viscosity.

*Example 5*

To a mixture consisting of 2.0821 g. (0.0100 mole) of the dipropiolate of 2,2-dimethyl-1,3-propanediol, 1.0415 g. (0.0100 mole) of 2,2-dimethyl-1,3-propanediol and 7.5 ml. of dioxane there was added 0.5 ml. of catalyst solution which had been prepared by diluting 0.2243 g. of triethylenediamine to 10 ml. with pure dioxane. A strong exothermic reaction occurred within a minute, and within 45 minutes the very light yellow reaction mixture became somewhat viscous. It was then maintained in an oven at 50° C. for 12 hours and subsequently at room temperature for 65 hours. The very light amber viscous product thus obtained was coagulated and broken up in 150 ml. of methanol and the whole allowed to stand for 18 hours. It was then extracted with ether for an hour and the washed solids dried at 115° C. for 5 hours. There was thus obtained 2.90 g. (92.8% theoretical yield) of the light amber, well-fused high molecular weight polyester. It was soluble in cyclohexanone, and a 0.2% cyclohexanone solution thereof was found to have a specific viscosity of 0.078 at 120° C. Clash-Berg and tensile strength evaluation made on a molded specimen of the polymer gave the following values:

| | | |
|---|---|---|
| $T_f$ | °C | 25.5 |
| $T_{2000}$ | °C | 39.0 |
| Modulus/25° C. | p.s.i. | 145,000 |
| Tensile strength: | | |
| Yield | p.s.i. | 1,778 |
| Break | p.s.i. | 2,358 |
| Percent elongation: | | |
| Yield | | 6 |
| Break | | 232 |

*Example 6*

To a mixture consisting of 5.2052 g. (0.0250 mole) of the dipropiolate of 2,2-dimethyl-1,3-propanediol, 2.7527 g. (0.0250) mole) of hydroquinone, and 19 ml. of purified dioxane there was added 1 ml. of a catalyst solution which had been prepared by diluting 1.265 g. of N-methylmorpholine to 10 ml. with dioxane. The reaction mixture was maintained in a capped bottle on a rotating rack in an oven at 80–82° C. for 21 hours. After being allowed to cool the mixture was coagulated with methanol, and the coagulates soaked for one hour in methanol and then for one hour in water. After subsequently drying for 20 hours at 80° C. there was obtained 7.86 g. (98.8% theoretical yield) of the cream-colored, solid linear polyester, insoluble in benzene and soluble in cyclohexanone upon heating at 80° C. An 0.2% solution of the polymer in cyclohexanone was found to have a specific viscosity of 0.094 at 25° C. Compression molding at 140° C. gave a light yellow molded piece of good clarity and ductility. Clash-Berg and tensile strength evaluation gave the following values: $T_f$ 33° C., $T_{2000}$ 42.5° C., modulus/25° C. 420,000 p.s.i. and tensile strength at yield 5090 p.s.i., and at break 1670 p.s.i. Elongation was 5% at yield and 136% at break.

*Example 7*

To a mixture consisting of 0.01000 mole each of p-xylene-$\alpha,\alpha'$-diol and the dipropiolate of 2,2-dimethyl-1,3-propanediol in 8 ml. of dioxane there was added 0.10 ml. of a catalyst solution which had been prepared by diluting 0.2243 g. of triethylenediamine to 10 ml. with pure dioxane. An exothermic reaction was noted after one minute and the clear yellow solution became somewhat viscous within 30 minutes. It was then heated at 50° C. for two hours and allowed to stand at room temperature for 22 hours. The resulting light amber, extremely viscous mass was coagulated in methanol, washed with water and dried at 115° C. to give a 98.9% yield of the almost white solid polyester. An 0.2% cyclohexanone solution thereof had a specific viscosity of 0.114 at 25° C. The molded specimen obtained from the polymer by compression molding at 130° C. was very light amber in color and of excellent clarity. Clash-Berg evaluation of the polymer gave $T_f$ 40° C., $T_{2000}$ 45° C. and a torsional modulus of 330,000 p.s.i./25° C. Evaluation of the mechanical properties gave a tensile strength of 6925 p.s.i. at yield and 3790 p.s.i. at break and an elongation of 5.5% at yield and 133% at break.

*Example 8*

To a mixture consisting of 5.2052 g. (0.0250 mole) of the dipropiolate of 2,2-dimethyl-1,3-propanediol, 4.6550 g. (0.0250 mole) of p,p'-biphenol, and 19 ml. of dioxane there was added 1 ml. of catalyst solution which had been prepared by diluting 1.265 g. of N-methylmorpholine to 10 ml. with dioxane. The reaction mixture was then maintained in a closed container on a rotating rack in an oven at 80° C. for 21 hours. It was then allowed to cool and was coagulated with methanol. The coagulates thus obtained were soaked in methanol for one hour and then in water for one hour. Upon drying for 20 hours at 80° C. there was obtained 10.02 g. of the solid, yellow linear polyester which was insoluble in benzene and soluble in cyclohexanone. An 0.2% cyclohexanone solution of the polymer was found to have an intrinsic viscosity of 0.575. Compression molding of the presently obtained polyester at 130° C. gave an amber, ductile molded piece of good clarity. Clash-Berg evaluations gave $T_f$ 51° C., $T_{2000}$ 58° C. The molded polymer was found to have a tensile strength of 6700 p.s.i. at yield and 4940 p.s.i. at break. The elongation was found to be 3% at yield and 290% at break.

*Example 9*

To a mixture consisting of 0.015694 mole of the dipropiolate of 2,2-dimethyl-1,3-propanediol, 0.014125 mole of ethylene glycol and 0.001569 mole of 4,4'-isopropylidenediphenol and 12 ml. of pure dioxane there was added 0.79 ml. of a catalyst solution prepared by diluting 0.2243 g. of triethylenediamine to 10 ml. with pure dioxane. A strong exothermic reaction was noted immediately; accordingly, cooling in a water bath (for about a minute) was employed. The reaction mixture became very viscous after 2 hours and was subsequently allowed to stand at room temperature for an additional 20 hours. The clear, yellowish product thus obtained was coagulated in 150 ml. of methanol, the coagulate was allowed to stand in methanol for 2 hours and subsequently in water for 2 hours, and dried in an air-oven at 115° C. The cream colored solid linear polyester thus obtained in a 98.9% yield was soluble in cyclohexanone. The specific viscosity of an 0.2% cyclohexanone solution of the polymer was found to be 0.114 at 25° C. Clash-Berg and mechanical strength evaluation of a molded specimen prepared from the dried polymer gave the following values:

| | | |
|---|---|---|
| $T_f$ | °C | 26.5 |
| $T_{2000}$ | °C | 39 |
| Modulus/25° C. | p.s.i. | 175,000 |
| Tensile strength: | | |
| Yield | p.s.i. | 1,770 |
| Break | p.s.i. | 3,080 |
| Percent elongation: | | |
| Yield | | 5.5 |
| Break | | 266 |

Example 10

To a mixture consisting of 4.1641 g. (0.02 mole) of the dipropiolate of 2,2-dimethyl-1,3-propanediol and 4.5656 g. (0.02 mole) of 4,4'-isopropylidenediphenol and 12 ml. of dioxane there was added 0.1 g. (4 drops) of N-methylmorpholine. The colorless reaction mixture, containing some undissolved phenol was agitated, and after 4 minutes a mild exothermic reaction was noted. The whole was then maintained in an 80° C. oven for 17 hours. At the end of that time the very light yellow, clear, non-flowable reaction mixture was taken up with acetone and coagulated with methanol. The coagulate was digested methanol, washed first with methanol and then with water and dried overnight at 105° C. There was thus obtained 8.64 g. (99% theoretical yield) of the substantially white, linear polyester. An 0.2% cyclohexanone solution thereof had a specific viscosity of 0.212 at 25° C. Compression molding of the polymer at 126° C. gave a very light straw-colored, molded piece. Evaluation gave Clash-Berg values of $T_f$ 61° C. and $T_{2000}$ 75° C. The molded polyester was found to have a tensile strength of 8310 p.s.i. at yield and 5940 p.s.i. at break, and an elongation of 11% at yield and 213% at break.

Example 11

To a mixture consisting of 2.0821 g. (0.0100 mole) of the dipropiolate of 2,2-dimethyl-1,3-propanediol and an equimolar amount (2.2828 g.) of 4,4'-isopropylidenediphenol there was added a solution consisting of 0.0506 g. of N-methylmorpholine in 8 ml. of benzene at room temperature. The reaction mixture was shaken frequently and after 13 minutes a mild exothermic reaction was noted. At this point, about 20% of the phenol had not dissolved. After shaking for another 2 hours the reaction mixture was a clear, almost colorless solution. It was then allowed to stand overnight (about 15 hours), at the end of which time it had become very viscous, though clear. For convenience, it was allowed to stand for about a week before it was coagulated with ethanol. The coagulate was digested and washed well, first with ethanol and then with water. After drying the solids overnight at 105° C. there was obtained the substantially white linear polyester. An 0.2% benzene solution thereof had a specific viscosity of 0.087 at 25° C. Compression molding of the polymer at 120° C. gave a transparent, pliable molded piece of very light color. Evaluation of the molded polymer gave a tensile strength of 7343 p.s.i. at yield and 4370 p.s.i. at break and an elongation of 5.0% at yield and 116% at break.

Example 12

To a mixture consisting of 2.0821 g. (0.010 mole) of the dipropiolate of 2,2-dimethyl-1,3-propanediol and 2.828 g. (0.010 mole) of 4,4'-isopropylidenediphenol in benzene there was added a 4% benzene solution of N-methylmorpholine in a quantity calculated to give 50 millimoles of catalyst per mole of the phenol. The total amount of benzene present in the reaction mixture after the catalyst charge was 8 cc. The resulting reaction mixture was allowed to stand at room temperature for 3 hours, at the end of which time it had become very viscous, though clear and of light color. It was then coagulated in ethanol, extracted with ethanol and water and the colorless, stiff, taffy-like solid thus obtained was dried in an 80° oven for 18 hours. There was thus obtained 4.38 g. (100% yield) of the substantially colorless linear polyester. An 0.2% benzene solution of the polymer had an intrinsic viscosity of 0.445. It was molded at 130° C. into a clear, almost colorless, tough, and ductile sheet. Evaluation of the mechanical strength of the molded polymer gave a tensile strength of 7730 p.s.i. at yield and 4172 p.s.i. at break and an elongation of 5% at yield and 68% at break.

Preparation of linear polyester from the dipropiolate of 2,2-dimethyl-1,3-propanediol and 4,4'-isopropylidenediphenol employing substantially the above procedure was also effected in the presence of the following catalysts: tributylamine, N-dimethylaniline, N,N-methylbenzylaniline, triethylamine and 1-ethylpiperidine. While the addition polymerization was catalyzed, the products varied with respect to color and mechanical properties. It was found that the effects of the various catalysts could be controlled by variation of the nature of the solvent and the quantity thereof. Thus, in a number of reactions conducted in the presence of triethylamine as catalyst, wherein there was employed as solvent ethylbenzene, acetone, a benzene-ethanol mixture, or ethylenedichloride, the chief difference appeared to be in color of the polymeric product.

Example 13

To a mixture consisting of 1,6542 g. of (0.01 mole) of chloral hydrate and 2.0821 g. (0.01 mole) of the dipropiolate of 2,2-dimethyl-1,3-propanediol there was added 7.9 ml. of purified dioxane, the whole was well stirred, and there was then added thereto 0.1 ml. of a catalyst solution prepared by diluting 0.2243 g. of triethylenediamine to 10 ml. with pure dioxane. Mild exothermic reaction was noted and the mixture was still colorless after 25 minutes. It was then allowed to stand at room temperature and gelling was noted at the end of about two hours. It was subsequently maintained at room temperature for about three days. The resulting colorless, firm, friable gel thus obtained was broken up in 150 ml. of methanol and the whole allowed to stand for 18 hours. It was then extracted with 150 ml. of water for one hour, and the residue was dried at 115° C. for 5 hours to give 3.75 g. (100.4% theoretical yield) of the very light yellow solid polyester. Its insolubility in cyclohexanone and the fact that it fused only partly indicated some cross-linking in the polymer structure. In another run the same quantities of chloral and of the dipropiolate of 2,2-dimethyl-1,3-propanediol and dioxane were employed but in order to catalyze the reaction there was used 0.5 ml. of a catalyst solution prepared by diluting 1.011 g. of N-methylmorpholine to 25 ml. with pure dioxane. Here there was also noted a mild exothermic reaction. The reaction mixture turned to a colorless gel within four hours when it was allowed to stand at 50° C. in an oven. After extracting with water and drying as above, a polymeric ester which resembled that obtained by using triethylenediamine as catalyst was isolated.

Example 14

To a mixture consisting of 5.2052 g. (0.0250 mole) of the dipropiolate of 2,2-dimethyl-1,3-propanediol, 9.1519 g. (0.0250 mole) of 4,4'-isopropylidene bis(dichlorophenol) and 19 ml. of dioxane there was added 1 ml. of a catalyst solution which had been prepared by diluting 1.265 g. of N-methylmorpholine to 10 ml. of dioxane. The reaction mixture was maintained on a rotating rack in an oven at 80° C. for 21 hours. At the end of that time it was coagulated with methanol and the coagulate digested with methanol and water. Drying at 80° C. for 20 hours gave 15.28 g. of the cream-colored, solid polyester. An 0.2% benzene solution of the polyester had an intrinsic viscosity of 0.210. Compression molding at 120° C. gave a dark amber molded piece of good clarity. Clash-Berg evaluation gave $T_f$ 76° C. and $T_{2000}$ 94° C. The tensile strength at break was found to be 4170 p.s.i.

Example 15

To a solution of 0.9419 g. (0.01 mole) of 1,2-ethanedithiol in 7.0 ml. of sodium-purified dioxane there was added 2.0821 g. (0.01 mole) of the dipropiolate of 2,2-dimethyl-1,3-propanediol. After stirring to solution, there was added 1 ml. of catalyst solution prepared by dissolving 0.5058 g. of triethylenediamine in 10 ml. of sodium-purified dioxane. An immediate exothermic reaction (to boiling) occurred and cooling by immersion in water was employed. The clear, colorless reaction mixture became very viscous after standing for one hour at room temperature. Heating for 17 hours at 54° C. gave a clear, essentially colorless, non-flowable solution. This was coagulated with methanol and the whole allowed to digest overnight. Filtration, water-washing, and drying of the solids for 8 hours at 105° C. gave 3.02 g. (100% yield) of the high molecular weight polyester which was insoluble in cyclohexanone and gave a soft gel in dimethylacetamide.

*Example 16*

To a mixture consisting of 4.5656 g. of 4,4'-isopropylidenediphenol, 15 ml. of pure dioxane and 0.20 ml. of a catalyst solution which had been prepared by dissolving 0.1122 g. of diethylenetriamine in pure dioxane there was dropped, during 15 minutes, with stirring and ice-bath cooling a mixture consisting of 3.3224 g. (0.02 mole) of the dipropiolate of ethylene glycol and 10 ml. of dioxane. After the addition was completed, the dropping funnel employed therefor was rinsed with 5 ml. of dioxane into the reaction mixture. The ensuing mildly exothermic reaction ceased after about an hour, at which time the temperature of the reaction mixture was 28° C. Stirring was continued for about another hour and then heat was applied and the reaction mixture was stirred at 60° C. for about 30 minutes. At this point the very viscous mixture could be stirred only with difficulty. It was coagulated in 200 ml. of water, and the whole was allowed to stand for several days. After washing the coagulate with fresh water, it was dried at 110° C. to give the solid, linear polyester. An 0.2% cyclohexanone solution thereof was found to have a specific viscosity of 0.027 at 25° C.

*Example 17*

To a mixture consisting of 0.010 mole each of the dipropiolate of ethylene glycol and 4,4'-isopropylidenediphenol there was added 8.0 ml. of dioxane and the whole was warmed to solution. The solution was then allowed to attain room temperature and there was added thereto 1.12 g. (1.275 ml.) of a solution which had been prepared by adding benzene to 0.5 g. of triethylenediamine to a total volume of 25 ml. There was no immediate evidence of reaction and the mixture was allowed to stand at room temperature for about 2 days, during which time it became rather viscous and orange-colored. It was coagulated in methanol, and the coagulate washed thoroughly with water and dried at 120° C. for 4 hours. The solid, resinous polyester thus obtained was soluble in cyclohexanone. An 0.2% solution of the polymer in this solvent was found to have an intrinsic viscosity of 0.52.

*Example 18*

To a mixture consisting of 2.1265 g. (0.0080455 mole) of the dipropiolate of 2-ethyl-2-butyl-1,3-propanediol, 1.8366 g. of 4,4'-isopropylidenediphenol and 4 ml. of dioxane there was added 0.9 ml. of an 0.5% benzene solution of triethylenediamine. The temperature of the reaction mixture rose from 26° C. to a peak of 51° C. in 23.5 minutes and decreased to 27° C. at the end of 55 minutes. The reaction mixture was then maintained in an oven at 60° C. for 16 hours. The polymer was then coagulated by treatment with water. After water washing and drying at 120° C. for 5 hours there was obtained the solid, high molecular polyester which was soluble in cyclohexanone. An 0.2% cyclohexanone solution of the polymer had a specific viscosity of 0.034 at 25° C.

*Example 19*

To a mixture consisting of 2.0446 g. (0.0077356 mole) of the dipropiolate of 2-ethyl-2-butyl-1,3-propanediol and 0.8209 g. of diethylene glycol there was added 0.18 ml. of an 0.5% benzene solution of triethylenediamine. Within 5 minutes the temperature rose from 26 to 28° C. and at this point there was added 0.36 ml. of catalyst solution. At the end of 11 minutes, after the first catalyst portion had been added the temperature of the reaction mixture was 31° C., but 5 minutes later it had decreased to 29.5° C. Accordingly, an additional 0.36 ml. of catalyst solution was added, whereupon the temperature increased very rapidly, with violent boiling, to a peak of 110° C. within another 1.5 minutes. Three minutes later (a total of 20.5 minutes after initiation of the reaction) the temperature had decreased to 70° C. and observation was discontinued. Subsequently, the amber viscous reaction mixture was placed in an oven and maintained therein at 60° C. for 16 hours. It was then coagulated and washed with water and dried at a temperature of 120° C. for 5 hours to give the high molecule weight, solid polyester. An 0.2% cyclohexanone solution thereof was found to have a specific viscosity of 0.024 at 25° C.

*Example 20*

To a cooled mixture consisting of 4.4749 g. (0.015 mole) of the dipropiolate of $\alpha^1,\alpha^4$-durenediol, 3.4242 g. of 4,4'-isopropylidenediphenol and 15 ml. of dioxane there was added 3.0 ml. of a catalyst solution which had been prepared by diluting 0.1680 g. of diethylenetriamine to 10 ml. with dioxane. The temperature of the reaction mixture rose from 25 to 41° C. within 4 minutes. With occasional ice cooling, the temperature was maintained at from 54–26° C. during the next 12 minutes. When, at the end of another 20 minutes the temperature remained at 26° C., the mixture was heated to 70° C. within 45 minutes. The very viscous, clear solution thus obtained was then maintained in an oven at 55° C. for 16 hours. At the end of this time the reaction mixture was coagulated with methanol, broken up and extracted with water and the coagulates dried overnight at 85° C. There was thus obtained 7.76 g. (98.4% theoretical yield) of the almost white solid polyester. An 0.2% solution thereof in cyclohexanone had an intrinsic viscosity of 0.535. It was readily compression molded to a clear sheet at 170° C. which was cut into strips and remolded to prepare Clash-Berg and tensile strength test pieces. There was thus obtained Clash-Berg values of $T_f$ 97° C., $T_{2000}$ 135° C. and modulus/25° C. 400,000 p.s.i. and a tensile strength of 9150 p.s.i. at break at 8% elongation.

*Example 21*

To a mixture consisting of 2.2828 g. (0.01 mole) of 4,4'-isopropylidenediphenol, 3.2828 g. (0.01 mole) of the dipropiolate of said phenol, and 10 ml. of purified dioxane there was added 1.0 ml. of a catalyst solution which had been prepared by dissolving 0.0561 g. of diethylenetriamine in 10 ml. of dioxane. Within 0.5 minute the temperature of the reaction mixture rose from 26.5° C. to 72° C. and at 0.5 minute later it reached a peak of 75° C. Two minutes later the temperature had decreased to 70° C. The reaction mixture was then alowed to stand at room temperature for 18 hours, coagulated in water containing a 1% concentration of hydrochloric acid, and the coagulate broken up in the Waring Blendor. After repeated and alternating washing with methanol and water and drying for 3 hours at 75° C., there was obtained a solid, linear polyester which dissolved in cyclohexanone to give an 0.2% solution having a specific viscosity of 0.074 at 25° C. It was compression molded with good flow at 170° C. to give a very light amber, clear and well-fused sheet. Evaluation by the Clash-Berg method gave $T_f$ 90° C., $T_{2000}$ 116° C. and 25° C. modules of 400,000 p.s.i. A specimen molded at 170° C. was found to have a density of 1.1782, a tensile strength of 8700 p.s.i. at yield and 6630 p.s.i. at break and an elongation of 8% at break and 54% at yield.

Example 22

To a mixture consisting of 4.3539 g. of the dipropiolate of p,p'-biphenol, 3.4242 g. of 4,4'-isopropylidenediphenol and 20 ml. of dioxane there was added 0.3 ml. of a catalyst solution which had been prepared by diluting 0.1680 g. of diethylenetriamine in 10 ml. of dioxane. An exothermic temperature rise peaked at 35° C. in 5.5 minutes. The very viscous liquid was cooled with a water bath for about 3 minutes, at which time 20 ml. of dioxane was stirred into the mixture. After a total reaction time of 15 minutes, the temperature of the reaction mixture was 26.5° C. The mixture was then coagulated in a Waring Blendor in 300 ml. of 30% aqueous methanol. The fibrous, almost colorless solids were filtered, washed first with 200 ml. of methanol and then with 300 ml. of water, and dried at 110° C. for 6 hours. The solid polyester thus obtained was found to have an intrinsic viscosity of 1.44 in m-cresol. Compression molding at 235° C. gave a somewhat yellowish molded piece of good clarity. Evaluation of the polyester by the Clash-Berg method gave $T_f$ 125° C., $T_{2000}$ 152° C., and 25° C. modules of 280,000 p.s.i. The molded product was found to have a tensile strength of 8200 p.s.i. at yield and 8700 p.s.i. at break and an elongation of 14.7% at yield and 67% at break.

Example 23

To a mixture consisting of 40.0000 g. (0.0200 mole) of a polypropylene glycol, commercially supplied as Dow P–2000, 4.8258 g. (0.023178 mole) of the dipropiolate of 2,2-dimethyl-1,3-propanediol was added 0.4880 g. of a catalyst solution consisting of 1 g. of triethylene diamine in 19 g. of dipropylene glycol. The mixture was stirred for 15 minutes while maintaining the reaction temperature at 25–30° C. by means of an ice bath. The reaction mixture was then allowed to stand at room temperature (about 27° C.) for 10 minutes and the resulting viscous, amber liquid was heated in a 60° C. oven for 66.5 hours. There was thus obtained the addition polymer of the dipropiolate and the polypropylene glycol which was soluble in cyclohexanone. An 0.2% solution of the polymer in this solvent had a specific viscosity of 0.064 at 25° C.

Example 24

The addition polymer of Example 23 was further reacted with either styrene, acrylonitrile or methyl methacrylate. The experiments were conducted by charging to each of six glass vials, 5.000 g. of said addition polymer, 0.0150 g. of azobisisobutyronitrile and the quantity of vinyl monomer shown below and maintaining the resulting mixtures at 60° C. for 66 hours.

| Run Number | Vinyl Monomer, g. | Moles Monomer/ Olefinic Bonds in Polymer, percent |
|---|---|---|
| 1 | None | None. |
| 2 | Styrene, 0.5330 g | 100. |
| 3 | Styrene, 2.1320 g | 400. |
| 4 | Acrylonitrile, 0.2715 g | 100. |
| 5 | Acrylonitrile, 1.0860 g | 400. |
| 6 | Methyl Methacrylate, 2.0476 g | 400. |

No notable change was observed in Run No. 1. The product obtained in Run No. 2 was a light amber, slightly opaque soft rubber. By using the increased amount of styrene shown in Run No. 3 there was obtained a white, opaque, firm rubber. The product obtained in Run No. 4 was a light amber, clear, soft rubber. Use of the greater amounts of acrylonitrile in Run No. 5 resulted in a rubber which was slightly opaque and had less elasticity than the product obtained in Run No. 4. The product obtained in Run No. 6, i.e., with methyl methacrylate, was a light cream, opaque semi-solid of somewhat cheesy consistency.

The rubbery cross-linked products obtained in Examples 2–5 can be compounded with conventional fillers, e.g., carbon black, zinc oxide, etc., and molded. The product of Example 6 can be vulcanized, e.g., with sulfur, and molded under curing conditions to give tough products of good resistance to heat and moisture.

For many purposes it will be valuable to prepare mixtures of the presently provided addition polymers and a monomeric vinyl compound for comercial utilization as laminating or impregnating compositions, introduction of the polymerization catalyst to be effected just prior to application in laminating or impregnating uses. Generally speaking, the hardenable mixtures will consist of, say, 50% to 95% by weight of the addition polymer and from 5% to 45% of the vinyl monomer. An inhibitor of polymerization, for example, p-tert-butylcatechol may be employed in the mixture; this may be desirable when the mixture is to be exposed to above average atmospheric temperatures for any substantial length of time.

What we claim is:

1. The method which comprises contacting in the presence of a basic, organic catalyst and an inert, organic liquid diluent, a diester of the formula

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals and bivalent halohydrocarbon radicals of from 2 to 18 carbon atoms and is linked through diverse carbon atoms thereof to the remainder of the molecule of which it forms a part, with a substantially equimolar quantity of a compound of the formula HX—Y—XH where X is selected from the class consisting of oxygen and sulfur and Y is selected from the class consisting of hydrocarbyl and halohydrocarbyl radicals of from 2 to 18 carbon atoms and alkyleneoxyalkylene and polyalkyleneoxyalkylene radicals having from 2 to 4 carbon atoms in each alkylene group, a total of from 1 to 100 oxygen atoms and a total of from 2 to 101 alkylene radicals, and recovering an olefinic, linear polyester from the resulting reaction product.

2. The method which comprises contacting in the presence of a basic, organic catalyst, and an inert, organic liquid diluent, a hydrocarbon diol having from 2 to 18 carbon atoms in the hydrocarbon radical with a substantially equimolar quantity of the dipropiolate of said diol and recovering an olefinic, linear polyester from the resulting reaction product.

3. The method which comprises contacting ethylene glycol with a substantially equimolar quantity of the dipropiolate of 2,2-dimethyl-1,3-propanediol in the presence of a basic, organic catalyst and an inert, organic liquid diluent and recovering an olefinic, linear polyester from the resulting reaction product.

4. The method which comprises contacting diethylene glycol with a substantially equimolar quantity of the dipropiolate of 2,2-dimethyl-1,3-propanediol in the presence of a basic, organic catalyst and an inert, organic liquid diluent and recovering an olefinic, linear polyester from the resulting reaction product.

5. The method which comprises contacting 2,2-dimethyl-1,3-propanediol with a substantially equimolar quantity of the dipropiolate of 2,2-dimethyl-1,3-propanediol in the presence of a basic, organic catalyst and an inert, organic liquid diluent and recovering an olefinic, linear polyester from the resulting reaction product.

6. The method which comprises contacting p-xylene-α,α' diol with a substantially equimolar quantity of the dipropiolate of 2,2-dimethyl-1,3-propane in the presence of a basic, organic catalyst and an inert, organic liquid diluent and recovering an olefinic, linear polyester from the resulting reaction product.

7. The method which comprises contacting 4,4'-isopropylidenediphenol with a substantially equimolar quantity of the dipropiolate of p,p-biphenol in the presence of a basic, organic catalyst and an inert, organic liquid diluent and recovering an olefinic, linear polyester from the resulting reaction product.

8. The method which comprises contacting an aryl diol of from 6 to 18 carbon atoms with a substantially equimolar quantity of the dipropiolate of said diol in the presence of a basic, organic catalyst and an inert, organic liquid diluent and recovering an olefinic, linear polyester from the resulting reaction product.

9. The olefinic, linear polyester prepared by the process defined in claim 1.

10. A polymeric product prepared by reacting the polyester obtained in claim 1 with a mono vinyl compound which is copolymerizable with said polyester in the presence of a catalyst of polymerization.

References Cited by the Examiner

UNITED STATES PATENTS 2,249,535  7/41  Macallum _____ 260—89.3

WILLIAM H. SHORT, *Primary Examiner.*

H. N. BURNSTEIN, LOUISE P. QUAST, *Examiners.*